(12) United States Patent
Tatsushima (10) Patent No.: US 11,852,298 B2
(45) Date of Patent: Dec. 26, 2023

(54) HIGH-PRESSURE GAS TANK AND METHOD FOR MANUFACTURING HIGH-PRESSURE GAS TANK

(71) Applicant: HONDA MOTOR CO., LTD., Tokyo (JP)

(72) Inventor: Kosuke Tatsushima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/678,984

(22) Filed: Feb. 23, 2022

(65) Prior Publication Data

US 2022/0307648 A1    Sep. 29, 2022

(30) Foreign Application Priority Data

Mar. 29, 2021 (JP) ................. 2021-054989

(51) Int. Cl.
*F17C 1/06* (2006.01)
*F16J 12/00* (2006.01)

(52) U.S. Cl.
CPC ........... *F17C 1/06* (2013.01); *F16J 12/00* (2013.01); *F17C 2201/0109* (2013.01); *F17C 2201/056* (2013.01); *F17C 2203/0602* (2013.01); *F17C 2205/0305* (2013.01)

(58) Field of Classification Search
CPC ........ F17C 1/06; F17C 2201/0109; F17C 2201/056; F17C 2203/0602; F17C 2205/0305; F17C 1/00; F17C 2205/03; F17C 2205/0308; F17C 2205/0311; F16J 12/00
USPC .......................................... 220/581
See application file for complete search history.

(56) References Cited

U.S. PATENT DOCUMENTS

| 2015/0197382 | A1* | 7/2015 | Aoe | F17C 1/00 |
| | | | | 206/524.3 |
| 2017/0276294 | A1* | 9/2017 | Almagro | F17C 1/06 |
| 2017/0297259 | A1* | 10/2017 | Otsubo | B29C 65/48 |
| 2019/0257473 | A1* | 8/2019 | Kanezaki | F17C 1/02 |
| 2021/0123565 | A1* | 4/2021 | Kerforn | F17C 1/06 |

FOREIGN PATENT DOCUMENTS

| CN | 110925589 A | 3/2020 |
| JP | H10-332082 A | 12/1998 |
| JP | 2013167298 A * | 8/2013 |

(Continued)

OTHER PUBLICATIONS

Office Action dated Aug. 31, 2023 issued over the corresponding Chinese Patent Application No. 202210186033.4 with the English machine translation thereof.

*Primary Examiner* — John K Fristoe, Jr.
*Assistant Examiner* — Laura E. Parker
(74) *Attorney, Agent, or Firm* — Carrier, Shende and Associates P.C.; Joseph P. Carrier; Fulchand P. Shende (57) ABSTRACT

A cap of a high-pressure gas tank includes a first member and a second member. The first member is located on the inner side of a liner. The second member is located on the outer side of the liner and is connected to the first member. A rotation restricting structure includes a first rotation restricting portion and a second rotation restricting portion. The first rotation restricting portion is provided on an inner surface of the liner. The second rotation restricting portion is provided on the first member so as to be fitted into the first rotation restricting portion.

8 Claims, 9 Drawing Sheets

(56) References Cited

FOREIGN PATENT DOCUMENTS

| | | |
|---|---|---|
| JP | 2017-122464 A | 7/2017 |
| WO | WO-2012121059 A1 * | 9/2012 ................ F17C 1/16 |
| WO | 2015/197357 A1 | 12/2015 |

* cited by examiner

HIGH-PRESSURE GAS TANK AND METHOD FOR MANUFACTURING HIGH-PRESSURE GAS TANK

CROSS-REFERENCE TO RELATED APPLICATIONS

This application is based upon and claims the benefit of priority from Japanese Patent Application No. 2021-054989 filed on Mar. 29, 2021, the contents of which are incorporated herein by reference.

BACKGROUND OF THE INVENTION

Field of the Invention

The present invention relates to a high-pressure gas tank and a method for manufacturing the high-pressure gas tank.

Description of the Related Art

A high-pressure gas tank is mounted on, for example, a fuel cell vehicle. In this case, the high-pressure gas tank stores hydrogen gas to be supplied to a fuel cell system. This type of high-pressure gas tank is provided with a resin liner, a reinforcing layer made of fiber-reinforced resin, and a cap. The liner has a filling chamber that can be filled with gas. The reinforcing layer covers the outer surface of the liner to reinforce the liner. The cap is attached to the axial end of the liner. The reinforcing layer is generally formed by filament winding. In the filament winding, a rotational force is applied through the cap to the liner from a shaft fixed to the cap, and reinforced fibers (FRP) impregnated with resin are wound around the outer surface of the rotating liner a plurality of times.

For example, JP 2017-122464 A discloses a technique in which the rotation restricting convex portion on the outer surface of the liner is fitted into the rotation restricting concave portion of the flange portion of the cap to suppress the idle rotation of the cap relative to the liner during filament winding.

SUMMARY OF THE INVENTION

In the prior art disclosed in JP 2017-122464 A described above, there is a possibility that the liner is deformed by the gas in the filling chamber of the liner so as to fill the gap between the rotation restricting convex portion and the rotation restricting concave portion.

An object of the present invention is to solve the aforementioned problem.

According to an aspect of the present invention, provided is a high-pressure gas tank comprising: a liner in which a plurality of divided liners made of resin are joined together in an axial direction of the liner and which includes a filling chamber for gas on an inside thereof; a reinforcing layer formed by winding a fiber around an outer surface of the liner a plurality of times; a cap that is attached to an end opening located at an end of the liner in the axial direction, and includes a supply and discharge hole configured to supply and discharge gas to and from the filling chamber; and a rotation restricting structure configured to restrict rotation of the cap relative to the liner about an axis of the liner, wherein the cap includes a first member located on an inner side of the liner, and a second member located on an outer side of the liner and connected to the first member, and the rotation restricting structure includes a first rotation restricting portion provided on an inner surface of the liner, and a second rotation restricting portion provided on the first member so as to fit to the first rotation restricting portion.

According to another aspect of the present invention, provided is a method for manufacturing a high-pressure gas tank, the high-pressure gas tank including a liner in which a plurality of divided liners made of resin are joined together in an axial direction of the liner and which includes a filling chamber for gas on an inside thereof, the method comprising: a preparation step of preparing, among the plurality of divided liners, an end-side divided liner including an end opening to which a cap is attached, the end opening being located at an end of the liner in the axial direction; a cap attaching step of disposing, on an inner side of the end-side divided liner, a first member that is a constituent member of the cap, disposing, on an outer side of the end-side divided liner, a second member that is a constituent member of the cap, and connecting together the first member and the second member; a joining step of joining and integrating the plurality of divided liners to form the liner; and a reinforcing layer forming step of forming a reinforcing layer by winding a fiber around an outer surface of the liner a plurality of times while rotating the liner by applying a rotational force about an axis of the liner to the cap, wherein a first rotation restricting portion is provided on an inner surface of the end-side divided liner, and a second rotation restricting portion is provided on the first member, and in the cap attaching step, the second rotation restricting portion is fitted to the first rotation restricting portion in order to restrict rotation of the cap relative to the liner about the axis of the liner.

According to the present invention, the rotation restricting structure (the first rotation restricting portion and the second rotation restricting portion) suppresses the idle rotation of the cap relative to the liner during filament winding. Further, the first rotation restricting portion and the second rotation restricting portion are located not on the outer surface side but on the inner surface side of the liner. Therefore, the liner is not deformed by the gas in the filling chamber of the liner toward the gap between the first rotation restricting portion and the second rotation restricting portion. As a result, deformation of the liner due to the gas in the filling chamber of the liner can be suppressed.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
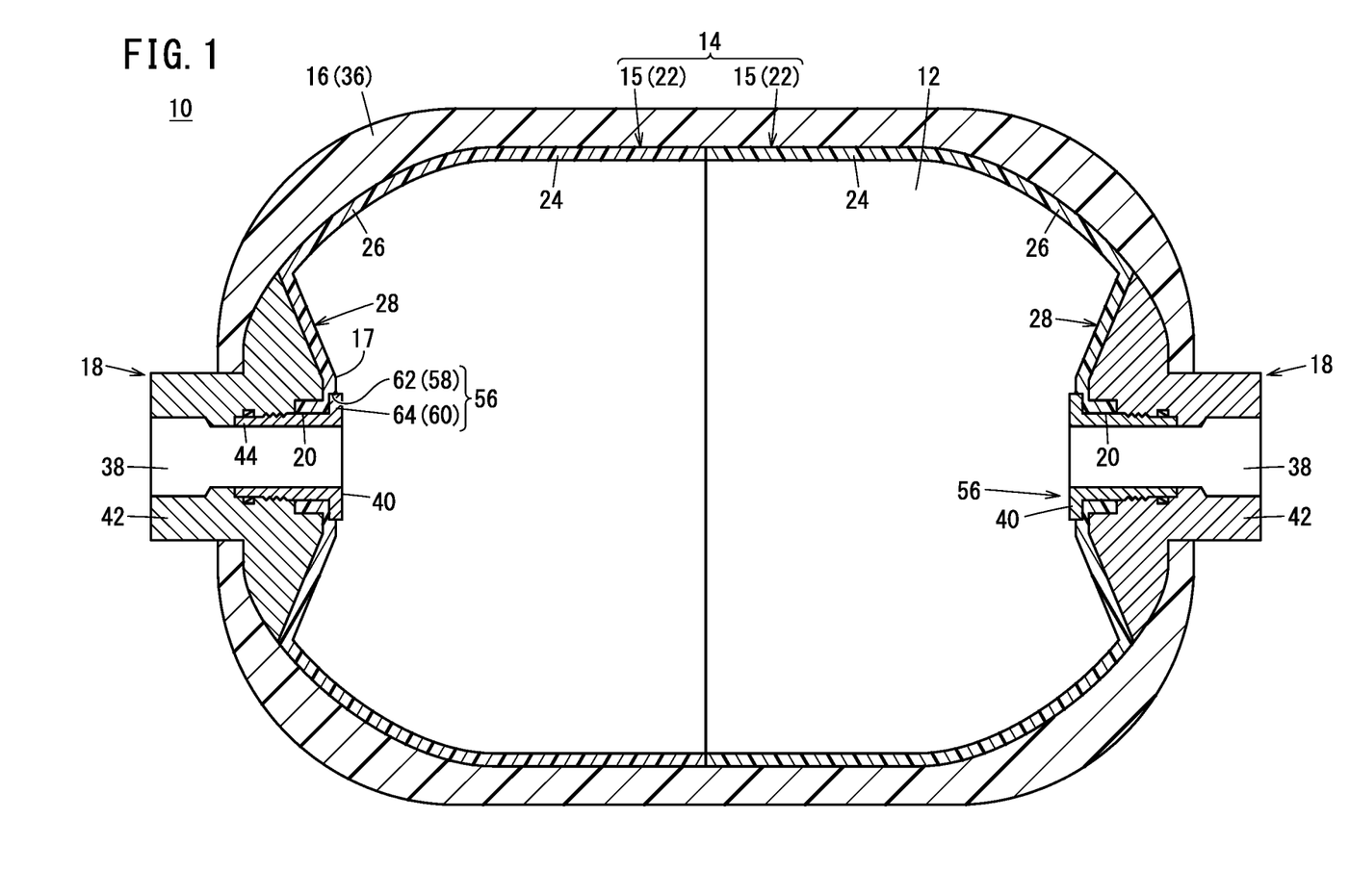
FIG. 1 is a cross-sectional view taken along an axial direction of a high-pressure gas tank according to an embodiment of the present invention.

A high-pressure gas tank 10 according to the present embodiment shown in FIG. 1 is, for example, a fuel tank (hydrogen tank) mounted on a fuel cell vehicle. When the high-pressure gas tank 10 is mounted on the fuel cell vehicle, the high-pressure gas tank 10 is filled with hydrogen gas at a high pressure. The hydrogen gas is supplied to the anode of a fuel cell (or fuel cell stack) mounted on the fuel cell vehicle.

The high-pressure gas tank 10 may be a tank applicable to vehicles other than fuel cell vehicles. The high-pressure gas tank 10 may be a fuel gas tank for storing fuel gas other than hydrogen gas. The high-pressure gas tank 10 may be a gas tank used in a facility for filling a fuel gas tank with fuel gas. Further, the high-pressure gas tank 10 may be a gas tank used for transporting fuel gas. The high-pressure gas tank 10 may be a tank for storing compressed natural gas or liquefied petroleum gas.

The high-pressure gas tank 10 is provided with a liner 14, a reinforcing layer 16, and two caps 18. The liner 14 includes, on the inside thereof, a filling chamber 12 for high-pressure gas. The reinforcing layer 16 covers the outer surface of the liner 14. The two caps 18 are attached to both axial ends of the liner 14.

The material that forms the liner 14 is, for example, a high density polyethylene (HDPE) resin having a hydrogen barrier function. In this case, since the HDPE resin is inexpensive and easy to process, there is an advantage that the liner 14 can be easily produced at low cost. Further, since the HDPE resin has excellent strength and rigidity, it is suitable for the liner 14 of the high-pressure gas tank 10.

Both axial ends of the liner 14 have end openings 20 for attaching the respective caps 18. The liner 14 includes a plurality of divided liners 15 made of resin. The plurality of divided liners 15 are joined together in the axial direction of the liner 14. In the liner 14 of the present embodiment, the two divided liners 15 are bilaterally symmetrical. That is, in the present embodiment, each divided liner 15 is an end-side divided liner 22. Each end-side divided liner 22 has an axial end of the liner 14. One cap 18 is attached to each end-side divided liner 22.

The liner 14 may have three or more divided liners 15. The three or more divided liners 15 are joined together in the axial direction of the liner 14. In this case, the liner 14 includes two end-side divided liners 22 located at both axial ends, and one or more cylindrical intermediate divided liners located in the middle.

The two divided liners 15 have a similar configuration. Each divided liner 15 includes a hollow trunk portion 24, a dome portion 26, and an annular concave wall portion 28. The trunk portion 24 has a substantially cylindrical shape. The dome portion 26 is gradually reduced in diameter from the trunk portion 24 toward the outside in the axial direction of the liner 14. The annular concave wall portion 28 is recessed inward in the axial direction of the divided liner 15 from the reduced-diameter end of the dome portion 26.

In this embodiment, the inner diameter and the outer diameter of the trunk portion 24 are substantially constant. The inner diameter and the outer diameter of the trunk portion 24 may be reduced or increased in a tapered manner toward the dome portion 26.

Figure 2:
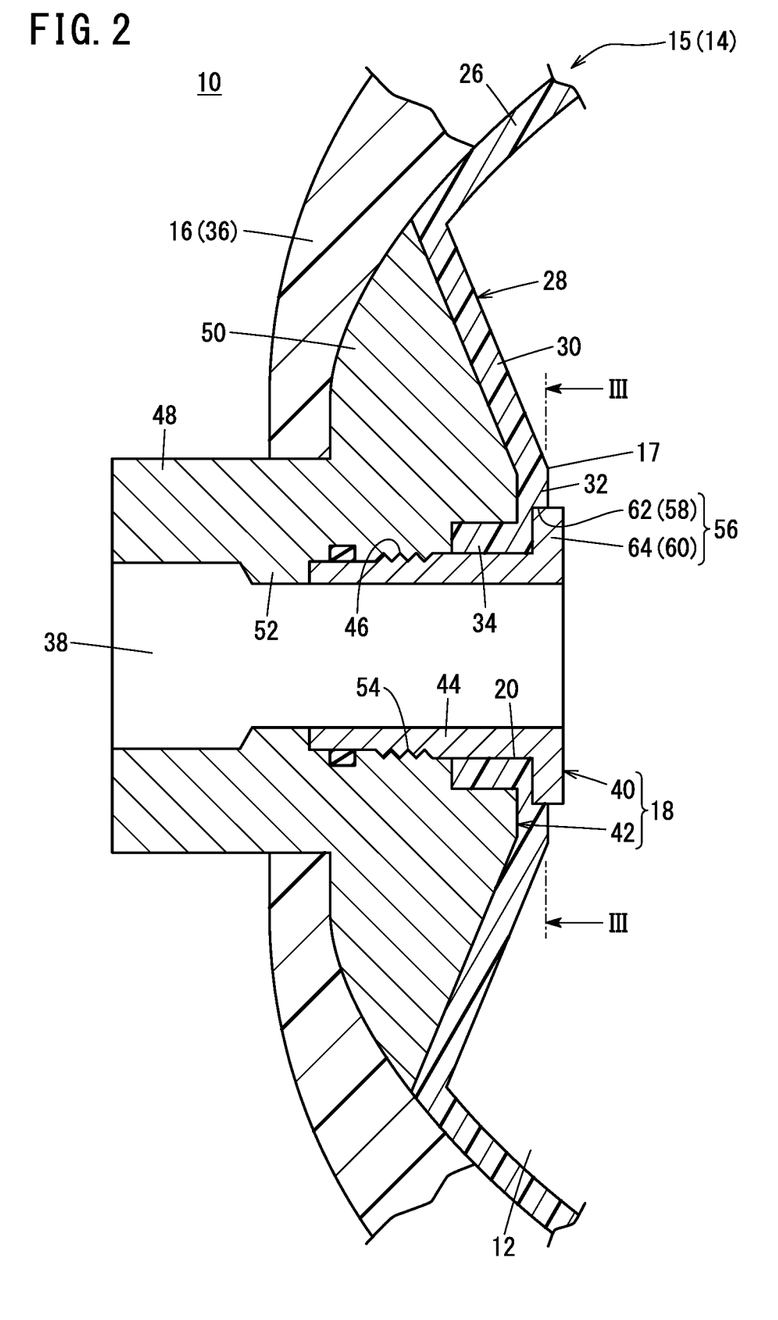
FIG. 2 is an enlarged cross-sectional view of an axial end of the high-pressure gas tank of FIG. 1.

As shown in FIG. 2, the annular concave wall portion 28 includes an annular inclined portion 30, an annular connection portion 32, and a tubular convex portion 34. The annular inclined portion 30 extends inward in the radial direction of the liner 14 from the reduced-diameter end of the dome portion 26 so as to be inclined inward in the axial direction of the liner 14. The annular connection portion 32 extends inward in the radial direction of the liner 14 from the extended end (inner end in the radial direction of the liner 14) of the annular inclined portion 30. The tubular convex portion 34 protrudes outward in the axial direction of the liner 14 from the extended end (inner end in the radial direction of the liner 14) of the annular connection portion 32. The inner hole of the tubular convex portion 34 is the end opening 20 of the liner 14.

In FIG. 1, the reinforcing layer 16 is formed of fiber-reinforced resin (FRP) in which reinforcing fibers are impregnated with a resin base material. That is, the reinforcing layer 16 is a laminate formed by winding resin-impregnated fibers (filaments, hereinafter simply referred to as "fiber 36") a plurality of times by filament winding and then curing the resin by heating, for example. Examples of FRP include CFRP, GFRP and the like.

Each cap 18 is a tubular member having a supply and discharge hole 38 for supplying and discharging high-pressure gas to and from the liner 14. Each cap 18 is made of metal. The two caps 18 have a similar configuration. It should be noted that the cap 18 may be attached to one axial end of the liner 14, and a closing member, instead of the cap 18, may be attached to the other axial end of the liner 14.

As shown in FIG. 2, each cap 18 has a first member 40 and a second member 42. The first member 40 is located on the inner surface side of the liner 14. The second member 42 is connected to the first member 40 so as to be located on the outer surface side of the liner 14. The first member 40 includes a cylindrical tubular portion 44 inserted through the end opening 20.

The tubular portion 44 is longer than the tubular convex portion 34. One end of the tubular portion 44 is located outside the liner 14. The other end of the tubular portion 44 is located on the inner surface side (inside the filling chamber 12) of the liner 14. The outer peripheral surface of the tubular portion 44 is in contact with the inner peripheral surface of the tubular convex portion 34. A portion of the outer peripheral surface of the tubular portion 44 that is located outside the tubular convex portion 34 in the axial direction of the liner 14 has a male thread 46.

The second member 42 includes a cylindrical boss portion 48, and a flange portion 50 protruding from the boss portion 48. The inner surface of the boss portion 48 includes an annular convex wall portion 52 protruding radially inward. A portion of the inner surface of the boss portion 48 that is located between the convex wall portion 52 and the filling chamber 12 has a female thread 54 into which the male thread 46 of the first member 40 is screwed. That is, the first member 40 and the second member 42 are connected to each other by screwing (screw connection) of the male thread 46 and the female thread 54. The boss portion 48 is in contact with the outer surface of the annular connection portion 32 and the outer surface of the tubular convex portion 34.

The flange portion 50 protrudes radially outward from the boss portion 48 and extends in a ring shape. The flange portion 50 is in contact with the outer surface of the annular inclined portion 30. Further, the outer surface of the flange portion 50 that faces outward in the axial direction of the liner 14 and the outer surface of the dome portion 26 are flush with each other.

As shown in FIG. 1, in such a high-pressure gas tank 10, rotation restricting structures 56 for restricting the rotation of the caps 18 relative to the liner 14 about the axis of the liner 14 are provided at both axial ends of the liner 14. The rotation restricting structures 56 each includes a first rotation restricting portion 58 and a second rotation restricting portion 60. The first rotation restricting portion 58 is located on an inner surface 17 (an inner surface of the axial end of the liner 14) of the liner 14 (each end-side divided liner 22). The second rotation restricting portion 60 is located on the first member 40 and is fitted to the first rotation restricting portion 58. The first rotation restricting portion 58 and the second rotation restricting portion 60 located at one end of the high-pressure gas tank 10 are configured in the same manner as the first rotation restricting portion 58 and the second rotation restricting portion 60 located at the other end of the high-pressure gas tank 10.

Figure 3:
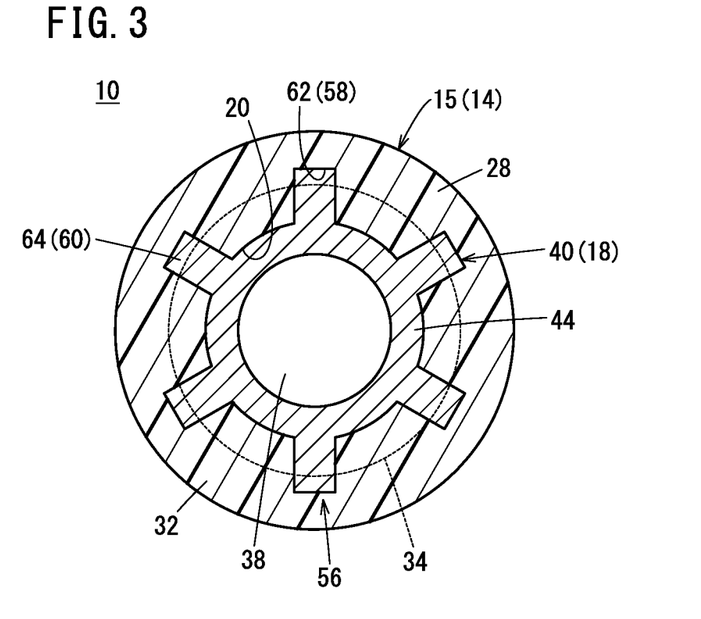
FIG. 3 is a cross-sectional view taken along the line III-III of FIG. 2.

As shown in FIGS. 2 and 3, the first rotation restricting portion 58 is located on a portion of the inner surface 17 of the liner 14 that is adjacent to the end opening 20. The first rotation restricting portion 58 includes a plurality of (for example, six) fitting recesses 62 extending radially outward from the end opening 20 of the liner 14. In FIG. 3, the plurality of fitting recesses 62 are equally spaced in the circumferential direction of the liner 14 when viewed from the axial direction of the liner 14 (in a cross section orthogonal to the axis of the liner 14). Each of the fitting recesses 62 has a rectangular shape when viewed from the axial direction of the liner 14. Each fitting recess 62 straddles the tubular convex portion 34 and the annular connection portion 32 (see FIG. 2).

In FIGS. 2 and 3, the second rotation restricting portion 60 is provided on a portion of the tubular portion 44 that is located on the inner surface side (filling chamber 12) of the liner 14. The second rotation restricting portion 60 includes a plurality of (for example, six) fitting projections 64 projecting radially outward from the other end of the tubular portion 44 so as to be inserted (fitted) into the fitting recesses 62. That is, the first member 40 is an integrally molded article having the tubular portion 44 and the plurality of fitting projections 64. Therefore, the first member 40 and the second member 42 hold the tubular convex portion 34, which is the inner peripheral wall portion of the end opening 20 of the liner 14, in the axial direction of the liner 14 by screw connection.

As shown in FIG. 3, the fitting projections 64 each have a shape corresponding to the fitting recess 62. Specifically, the fitting projections 64 are equally spaced in the circumferential direction of the tubular portion 44 when viewed from the axial direction of the liner 14. The fitting projections 64 each have a rectangular shape when viewed from the axial direction of the liner 14. The number, shape, position, size and the like of the fitting recesses 62 and the fitting projections 64 can be appropriately set.

Next, a method for manufacturing the high-pressure gas tank 10 will be described.

Figure 4:
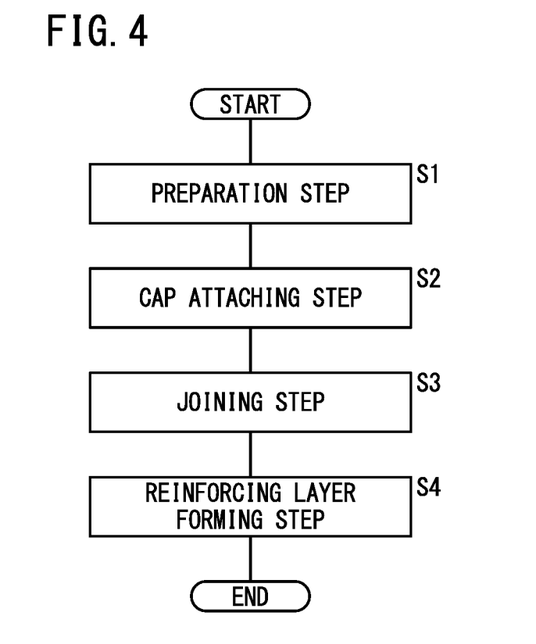
FIG. 4 is a flowchart for explaining a method for manufacturing the high-pressure gas tank of FIG. 1.

As shown in FIG. 4, the method for manufacturing the high-pressure gas tank 10 includes a preparation step, a cap attaching step, a joining step, and a reinforcing layer forming step.

In the preparation step (step S1), a plurality of divided liners 15 are prepared. Specifically, in the preparation step, two end-side divided liners 22 are prepared. The axial end of each end-side divided liner 22 includes the end opening 20 for attaching the cap 18. The cap attaching step is performed on each end-side divided liner 22.

Figure 5:
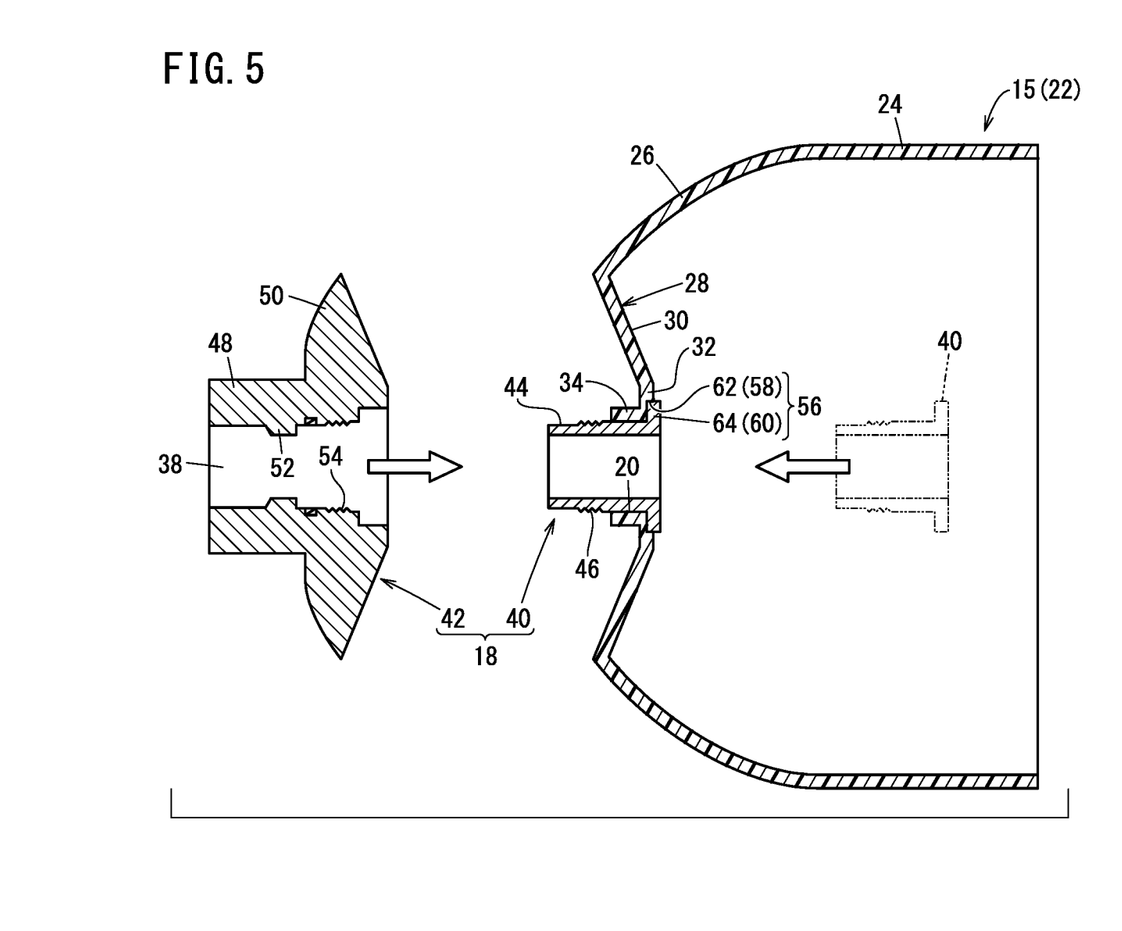
FIG. 5 is a cross-sectional explanatory view of a cap attaching step.

In the cap attaching step (step S2 in FIG. 4), as shown in FIG. 5, the first member 40, which is a constituent member of each cap 18, is inserted into the end opening 20 of each end-side divided liner 22 from the inner surface side of the end-side divided liner 22. As a result, a part of the first member 40 is located on the inner surface side of the end-side divided liner 22. At this time, the plurality of fitting projections 64 are fitted into the plurality of fitting recesses 62 provided on the inner surface 17 of the end-side divided liner 22. Thus, the relative rotation between the first member 40 and the divided liner 15 is restricted.

Subsequently, the second member 42, which is a constituent member of each cap 18, is connected to the first member 40 so as to be located on the outer surface side of each end-side divided liner 22. That is, the female thread 54 of the second member 42 is connected to the male thread 46 of the first member 40 by screwing. As a result, the tubular convex portion 34 (the inner peripheral wall portion of the end opening 20) is held between the first member 40 and the second member 42.

Figure 6:
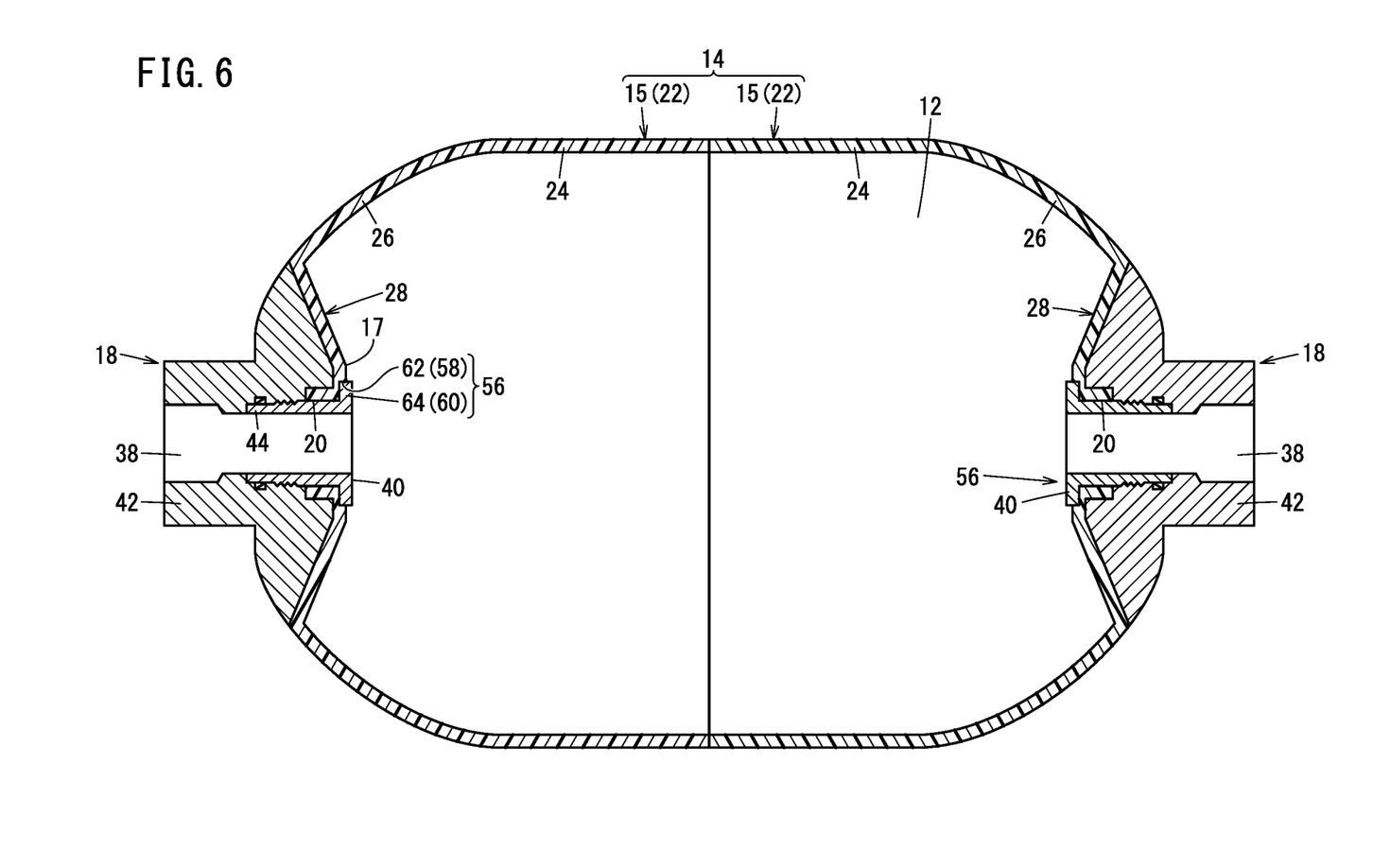
FIG. 6 is a cross-sectional explanatory view of a joining step.

In the joining step (step S3 in FIG. 4), as shown in FIG. 6, in a state in which the trunk portion 24 of one end-side divided liner 22 and the trunk portion 24 of the other end-side divided liner 22 are abutted against each other, the entire abutment portion is joined. As a result, the liner 14 in which the two end-side divided liners 22 are integrated is formed. In the joining step, various methods including welding, arc welding such as TIG welding, laser welding, and the like can be adopted. When the liner 14 is divided into three or more portions, an intermediate liner is disposed between the two end-side divided liners 22, and joining is performed thereon.

Figure 7:
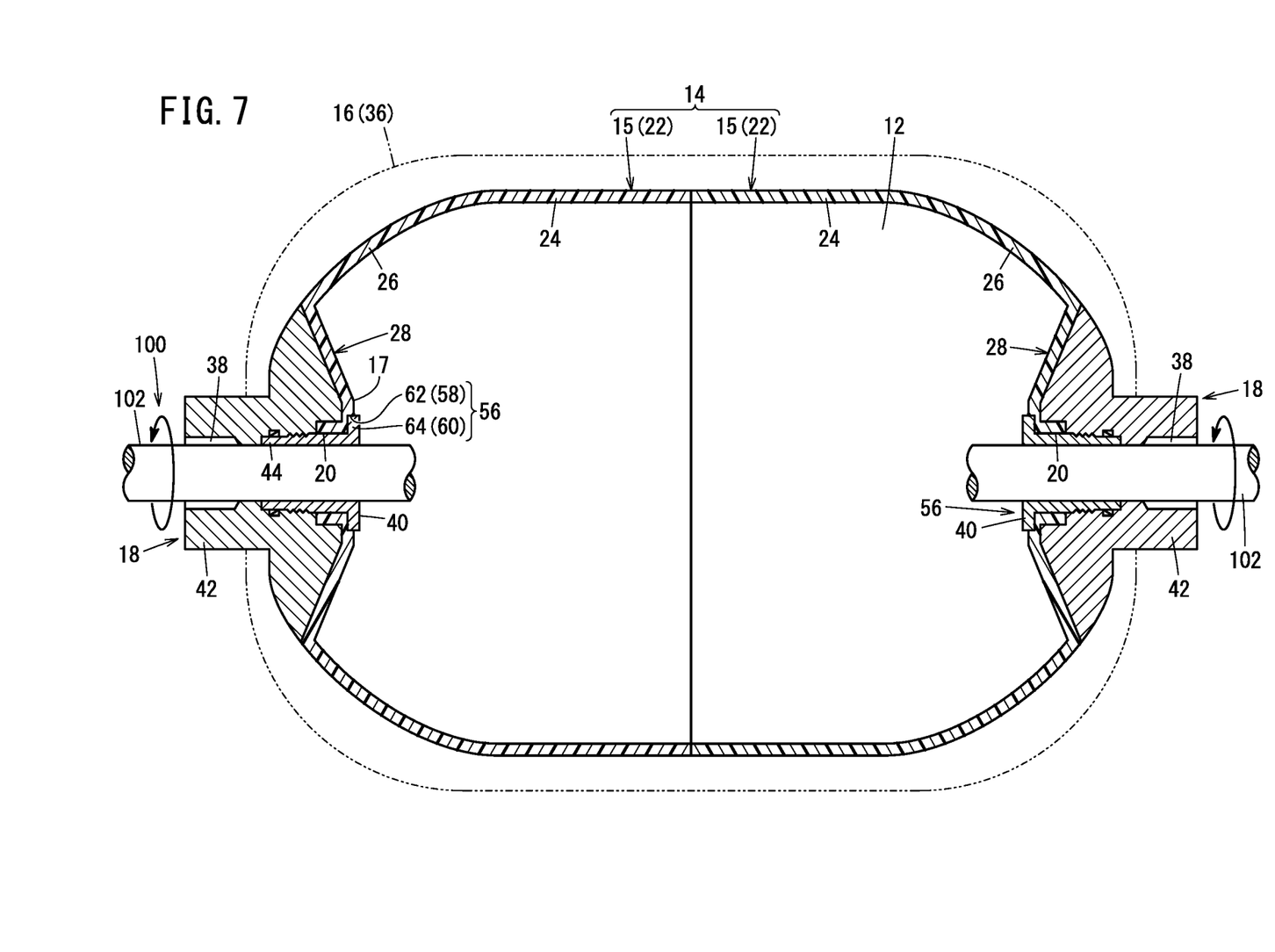
FIG. 7 is a cross-sectional explanatory view of a reinforcing layer forming step.

In the reinforcing layer forming step (step S4 in FIG. 4), as shown in FIG. 7, a rotational force about the axis of the liner 14 is applied to at least one of the two caps 18 to rotate the liner 14. Next, the reinforcing layer 16 is formed by winding the fiber 36 around the outer surface of the liner 14 a plurality of times while rotating the liner 14. Specifically, in the reinforcing layer forming step (filament winding step), for example, in a state in which a shaft 102 of a filament winding device 100 is fixed to both of the caps 18 (first members 40), the shaft 102 is rotated. Since the relative rotation between the first members 40 and the liner 14 is restricted by the rotation restricting structures 56, the rotational force (torque) transmitted from the shaft 102 to the first members 40 is efficiently transmitted to the liner 14. In other words, it is possible to suppress the idle rotation of each cap 18 relative to the liner 14. Thus, the high-pressure gas tank 10 is manufactured.

The present embodiment has the following effects.

According to the present embodiment, the rotation restricting structure 56 (the first rotation restricting portion 58 and the second rotation restricting portion 60) suppresses the idle rotation of each cap 18 relative to the liner 14 during filament winding. Further, the first rotation restricting portion 58 and the second rotation restricting portion 60 are located not on the outer surface side but on the inner surface side of the liner 14. Therefore, the liner 14 is not deformed toward the gap between the first rotation restricting portion 58 and the second rotation restricting portion 60 by the gas (high-pressure gas) in the filling chamber 12 of the liner 14. Accordingly, deformation of the liner 14 due to the gas in the filling chamber 12 of the liner 14 can be suppressed.

The first member 40 includes the tubular portion 44 inserted into the end opening 20 of the liner 14. The first rotation restricting portion 58 is provided on a portion of the inner surface 17 of the liner 14 that is adjacent to the end opening 20. The second rotation restricting portion 60 is provided on a portion of the tubular portion 44 that is located on the inner surface side of the liner 14.

According to such a configuration, it is possible to suppress an increase in the size of each cap 18.

The tubular portion 44 has a cylindrical shape. The first rotation restricting portion 58 includes the plurality of fitting recesses 62 extending radially outward from the end opening 20. The second rotation restricting portion 60 includes the plurality of fitting projections 64 projecting radially outward from the tubular portion 44 so as to be inserted into the fitting recesses 62. The plurality of fitting recesses 62 are arranged in the circumferential direction of the tubular portion 44. The plurality of fitting projections 64 are arranged in the circumferential direction of the tubular portion 44.

According to such a configuration, by fitting the plurality of fitting projections 64 into the plurality of fitting recesses 62, respectively, it is possible to effectively suppress idle rotation of each cap 18 relative to the liner 14 during filament winding. Further, the rotational force acting on each cap 18 can be efficiently transmitted to the liner 14 during the filament winding.

The first member 40 and the second member 42 are connected to each other by screwing to hold the liner 14 therebetween in the axial direction of the liner 14.

According to such a configuration, each cap 18 can be fixed to the liner 14 in the axial direction and the circumferential direction of the liner 14.

The liner 14 includes the dome portion 26 and the annular concave wall portion 28. The dome portion 26 is reduced in diameter toward the outside in the axial direction of the liner 14. The annular concave wall portion 28 is recessed inward in the axial direction of the liner 14 from the reduced-diameter end of the dome portion 26, and includes the end opening 20 in the center thereof. The annular concave wall portion 28 includes the annular inclined portion 30, the annular connection portion 32, and the tubular convex portion 34. The annular inclined portion 30 extends inward in the radial direction of the liner 14 from the reduced-diameter end of the dome portion 26 so as to be inclined inward in the axial direction of the liner 14. The annular connection portion 32 extends inward in the radial direction of the liner 14 from the extended end of the annular inclined portion 30. The tubular convex portion 34 protrudes outward in the axial direction of the liner 14 from the extended end of the annular connection portion 32. The second rotation restricting portion 60 is positioned so as to straddle the tubular convex portion 34 and the annular connection portion 32.

According to such a configuration, the length of the high-pressure gas tank 10 in the axial direction can be shortened.

Figure 8:
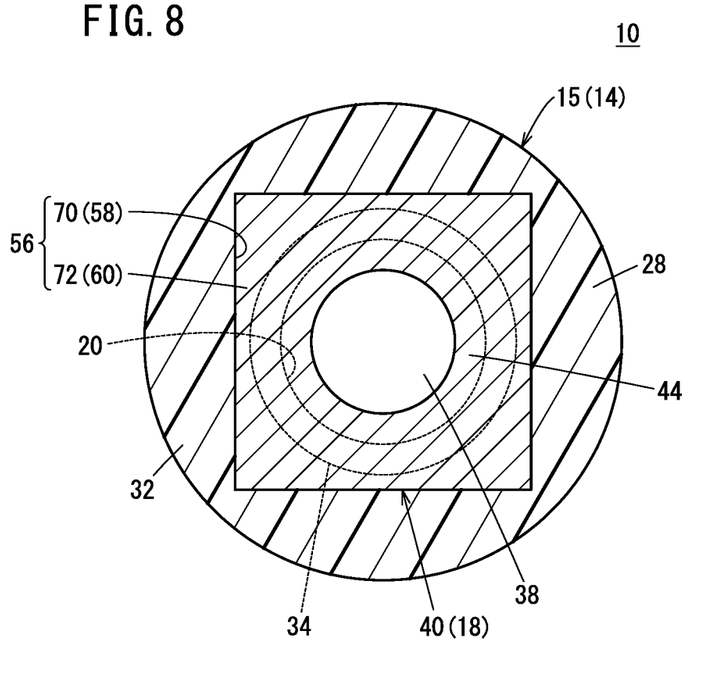
FIG. 8 is a cross-sectional view showing a main part of a high-pressure gas tank according to a first modification.

In the embodiment (first modification) shown in FIG. 8, the first rotation restricting portion 58 includes a fitting recess 70 formed on the inner surface 17 of the liner 14. The second rotation restricting portion 60 includes a fitting projection 72 fitted into the fitting recess 70. The fitting recess 70 and the fitting projection 72 each have a polygonal outer shape when viewed from the axial direction of the liner 14. In the example of FIG. 8, the fitting recess 70 and the fitting projection 72 each have a quadrangular shape (rectangular shape) when viewed from the axial direction of the liner 14. The outer shape of the fitting recess 70 and the fitting projection 72 as viewed from the axial direction of the liner 14 is not limited to a quadrangular shape, but is preferably a polygonal shape having four to eight angles.

In this case, since the fitting recess 70 and the fitting projection 72 each have a polygonal outer shape as viewed from the axial direction of the liner 14, it is possible to suppress the idle rotation of each cap 18 relative to the liner 14 during filament winding.

Figure 9:
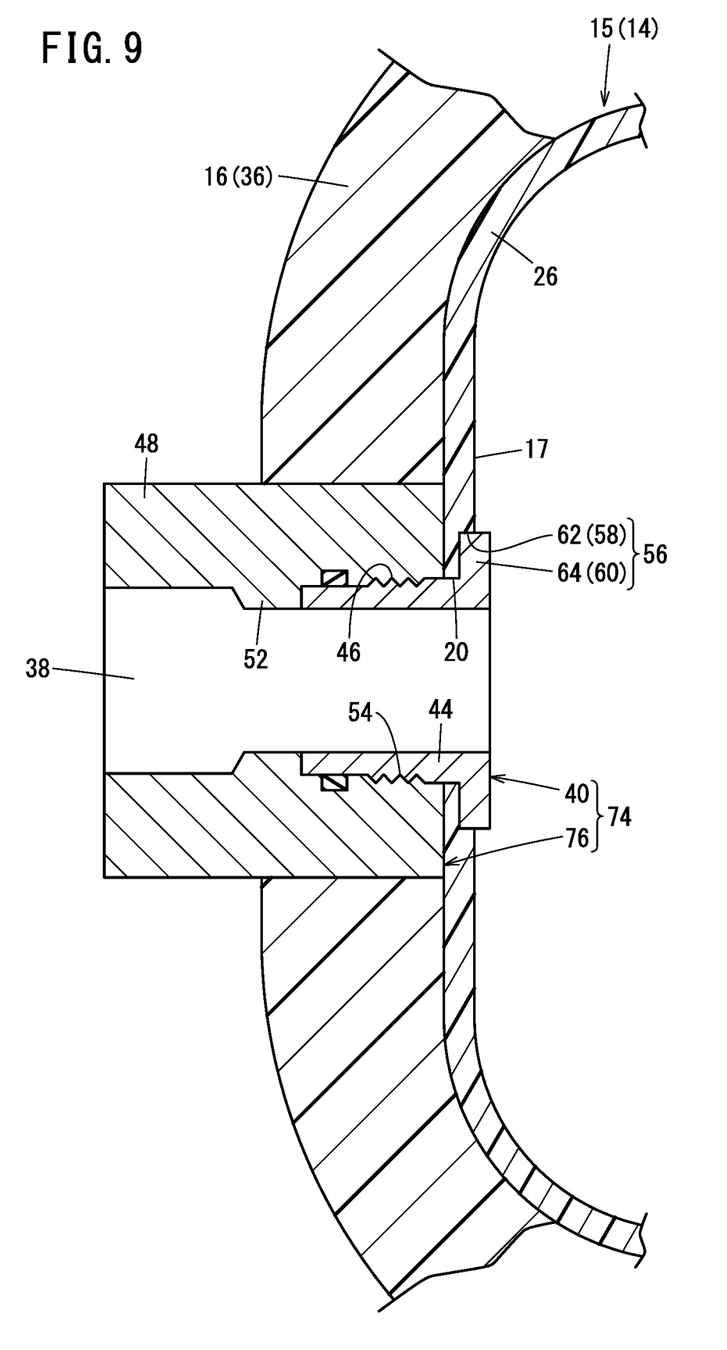
FIG. 9 is a cross-sectional view showing a main part of a high-pressure gas tank according to a second modification.

In the embodiment (second modification) shown in FIG. 9, the liner 14 does not have the annular concave wall portion 28. Each cap 74 is attached to a reduced-diameter end of the dome portion 26. Further, a second member 76 of each cap 74 does not include the flange portion 50 described above.

In this case, the contact area between the cap 74 and the reinforcing layer 16 can be reduced. As a result, it is possible to effectively prevent the cap 74 and the reinforcing layer 16 from rubbing against each other and wearing out, leading to fracture initiation, due to repeated use of the high-pressure gas tank 10.

The present invention is not limited to the above-described embodiments, and various configurations can be adopted therein without departing from the essence and gist of the present invention.

The embodiments described above can be summarized as follows.

The embodiments disclose a high-pressure gas tank (10) comprising: a liner (14) in which a plurality of divided liners (15) made of resin are joined together in an axial direction of the liner and which includes a filling chamber (12) for gas on an inside thereof; a reinforcing layer (16) formed by winding a fiber (36) around an outer surface of the liner a plurality of times; a cap (18, 74) that is attached to an end opening (20) located at an end of the liner in the axial direction, and includes a supply and discharge hole (38) configured to supply and discharge gas to and from the filling chamber; and a rotation restricting structure (56) configured to restrict rotation of the cap relative to the liner about an axis of the liner, wherein the cap includes a first member (40) located on an inner side of the liner, and a second member (42, 76) located on an outer side of the liner and connected to the first member, and the rotation restricting structure includes a first rotation restricting portion (58) provided on an inner surface (17) of the liner, and a second rotation restricting portion (60) provided on the first member so as to fit to the first rotation restricting portion.

In the high-pressure gas tank, the first member may include a tubular portion (44) inserted into the end opening of the liner, the first rotation restricting portion may be provided on a portion of the inner surface of the liner that is adjacent to the end opening, and the second rotation restricting portion may be provided on a portion of the tubular portion that is in contact with the inner surface of the liner.

In the high-pressure gas tank, the tubular portion may have a cylindrical shape, the first rotation restricting portion may include a plurality of fitting recesses (62) extending outward in a radial direction of the liner from the end opening, the second rotation restricting portion may include a plurality of fitting projections (64) projecting outward in the radial direction from the tubular portion so as to be inserted into the plurality of fitting recesses, the plurality of fitting recesses may be arranged in a circumferential direction of the tubular portion, and the plurality of fitting projections may be arranged in the circumferential direction of the tubular portion.

In the high-pressure gas tank, the first rotation restricting portion may include a fitting recess (70) formed on the inner surface of the liner, the second rotation restricting portion may include a fitting projection (72) fitted into the fitting recess, and the fitting recess and the fitting projection may each have a polygonal outer shape when viewed from the axial direction of the liner.

In the high-pressure gas tank, the first member and the second member may be connected to each other by screwing to hold the liner therebetween in the axial direction of the liner.

In the high-pressure gas tank, the liner may include a dome portion (26) having a diameter that is reduced toward an outside in the axial direction of the liner, and an annular concave wall portion (28) recessed inward in the axial direction of the liner from a reduced-diameter end of the dome portion, and including the end opening in a center thereof, the annular concave wall portion may include an annular inclined portion (30) extending inward in a radial direction of the liner from the reduced-diameter end of the dome portion so as to be inclined inward in the axial direction of the liner, an annular connection portion (32) extending inward in the radial direction of the liner from an extended end of the annular inclined portion, and a tubular convex portion (34) protruding outward in the axial direction of the liner from an extended end of the annular connection portion, and the second rotation restricting portion may be positioned so as to straddle the tubular convex portion and the annular connection portion.

The above embodiments disclose a method for manufacturing a high-pressure gas tank including a liner in which a plurality of divided liners made of resin are joined together in an axial direction of the liner and which includes a filling chamber for gas on an inside thereof, the method comprising: a preparation step of preparing, among the plurality of divided liners, an end-side divided liner (22) including an end opening to which a cap is attached, the end opening being located at an end of the liner in the axial direction; a cap attaching step of disposing, on an inner side of the end-side divided liner, a first member that is a constituent member of the cap, disposing, on an outer side of the end-side divided liner, a second member that is a constituent member of the cap, and connecting together the first member and the second member; a joining step of joining and integrating the plurality of divided liners to form the liner; and a reinforcing layer forming step of forming a reinforcing layer by winding a fiber around an outer surface of the liner a plurality of times while rotating the liner by applying a rotational force about an axis of the liner to the cap, wherein a first rotation restricting portion is provided on an inner surface of the end-side divided liner, and a second rotation restricting portion is provided on the first member, and in the cap attaching step, the second rotation restricting portion is fitted to the first rotation restricting portion in order to restrict rotation of the cap relative to the liner about the axis of the liner.

In the method for manufacturing the high-pressure gas tank described above, in the cap attaching step, the second member may be connected to the first member by screwing to hold the liner between the first member and the second member in the axial direction of the liner.

What is claimed is:

1. A high-pressure gas tank comprising:
   a liner in which a plurality of divided liners made of resin are joined together in an axial direction of the liner and which includes a filling chamber for gas on an inside thereof;
   a reinforcing layer formed by winding a fiber around an outer surface of the liner a plurality of times;
   a cap that is attached to an end opening located at an end of the liner in the axial direction, and includes a supply and discharge hole configured to supply and discharge gas to and from the filling chamber; and
   a rotation restricting structure configured to restrict rotation of the cap relative to the liner about an axis of the liner, wherein
   the cap includes a first member located on an inner side of the liner, and a second member located on an outer side of the liner and connected to the first member,
   the liner includes:
      a dome portion having a diameter that is reduced toward an outside in the axial direction of the liner; and
      an annular concave wall portion recessed inward in the axial direction of the liner from a reduced-diameter end of the dome portion, and including the end opening in a center thereof, the annular concave wall portion includes:
      an annular inclined portion extending inward in a radial direction of the liner from the reduced-diameter end of the dome portion so as to be inclined inward of the filling chamber in the axial direction of the liner;
      an annular connection portion extending inward in the radial direction of the liner from an extended end of the annular inclined portion; and
      a tubular convex portion protruding outward in the axial direction of the liner from an extended end of the annular connection portion, and
   the rotation restricting structure includes a first rotation restricting portion provided on an inner surface of the liner, and a second rotation restricting portion provided on the first member so as to fit to the first rotation restricting portion, and
   the second rotation restricting portion is positioned so as to straddle the tubular convex portion and the annular connection portion.

2. The high-pressure gas tank according to claim 1, wherein
   the first member includes a tubular portion inserted into the end opening of the liner,
   the first rotation restricting portion is provided on a portion of the inner surface of the liner that is adjacent to the end opening, and
   the second rotation restricting portion is provided on a portion of the tubular portion that is in contact with the inner surface of the liner.

3. The high-pressure gas tank according to claim 2, wherein
   the tubular portion has a cylindrical shape,
   the first rotation restricting portion includes a plurality of fitting recesses extending outward in a radial direction of the liner from the end opening,
   the second rotation restricting portion includes a plurality of fitting projections projecting outward in the radial direction from the tubular portion so as to be inserted into the plurality of fitting recesses,
   the plurality of fitting recesses are arranged in a circumferential direction of the tubular portion, and
   the plurality of fitting projections are arranged in the circumferential direction of the tubular portion.

4. The high-pressure gas tank according to claim 2, wherein
   the first rotation restricting portion includes a fitting recess formed on the inner surface of the liner,
   the second rotation restricting portion includes a fitting projection fitted into the fitting recess, and the fitting recess and the fitting projection each have a polygonal outer shape when viewed from the axial direction of the liner.

5. The high-pressure gas tank according to claim 1, wherein
the first member and the second member are connected to each other by screwing to hold the liner therebetween in the axial direction of the liner.

6. The high-pressure gas tank according to claim 1, wherein the first rotation restriction portion includes a fitting recess formed in a portion of the inner surface of the liner, the portion of the inner surface of the liner facing an inward direction in the axial direction of the liner, and the second rotation restriction portion includes a fitting projection fitted into the fitting recess.

7. A method for manufacturing a high-pressure gas tank, the high-pressure gas tank including a liner in which a plurality of divided liners made of resin are joined together in an axial direction of the liner and which includes a filling chamber for gas on an inside thereof,
the method comprising:
a preparation step of preparing, among the plurality of divided liners, an end-side divided liner including an end opening to which a cap is attached, the end opening being located at an end of the liner in the axial direction;
a cap attaching step of disposing, on an inner side of the end-side divided liner, a first member that is a constituent member of the cap, disposing, on an outer side of the end-side divided liner, a second member that is a constituent member of the cap, and connecting together the first member and the second member;
a joining step of joining and integrating the plurality of divided liners to form the liner; and
a reinforcing layer forming step of forming a reinforcing layer by winding a fiber around an outer surface of the liner a plurality of times while rotating the liner by applying a rotational force about an axis of the liner to the cap, wherein a first rotation restricting portion is provided on an inner surface of the end-side divided liner, and a second rotation restricting portion is provided on the first member, and in the cap attaching step, the second rotation restricting portion is fitted to the first rotation restricting portion in order to restrict rotation of the cap relative to the liner about the axis of the liner, the liner includes:
a dome portion having a diameter that is reduced toward an outside in the axial direction of the liner; and
an annular concave wall portion recessed inward in the axial direction of the liner from a reduced-diameter end of the dome portion, and including the end opening in a center thereof, the annular concave wall portion includes:
an annular inclined portion extending inward in a radial direction of the liner from the reduced-diameter end of the dome portion so as to be inclined inward of the filling chamber in the axial direction of the liner;
an annular connection portion extending inward in the radial direction of the liner from an extended end of the annular inclined portion; and
a tubular convex portion protruding outward in the axial direction of the liner from an extended end of the annular connection portion, and
the second rotation restricting portion is positioned so as to straddle the tubular convex portion and the annular connection portion.

8. The method for manufacturing the high-pressure gas tank according to claim 7, wherein
in the cap attaching step, the second member is connected to the first member by screwing to hold the liner between the first member and the second member in the axial direction of the liner.

* * * * *